United States Patent [19]

Kubovits et al.

[11] 4,173,484
[45] Nov. 6, 1979

[54] ARTIFICIAL STONE AND METHOD FOR MAKING

[75] Inventors: Imre Kubovits; Imre Mészáros, both of Budapest; Ferenc Kaszatnitzky; Mrs. László Szabó, both of Tatabánya; Péter Ottlik, Budapest, all of Hungary

[73] Assignee: Tatábanyai Szénbányák, Tatabánya, Hungary

[21] Appl. No.: 785,327

[22] Filed: Apr. 7, 1977

Related U.S. Application Data

[63] Continuation-in-part of Ser. No. 369,142, Jun. 12, 1973, abandoned.

[30] Foreign Application Priority Data

Jun. 12, 1972 [HU] Hungary .............................. TA 1191

[51] Int. Cl.² .................................................. C03C 3/22
[52] U.S. Cl. ...................................... 106/39.6; 65/33; 106/39.8
[58] Field of Search ................... 106/39.6, 39.8; 65/33, 65/99 A

[56] References Cited

U.S. PATENT DOCUMENTS

| 3,170,780 | 2/1965 | Takehara et al. | 65/19 |
| 3,231,456 | 1/1966 | McMillan et al. | 161/146 |
| 3,804,608 | 4/1974 | Gaskell et al. | 65/33 |
| 3,928,047 | 12/1975 | Kapolyi et al. | 106/39.6 |

FOREIGN PATENT DOCUMENTS 2329382  1/1974  Fed. Rep. of Germany.

Primary Examiner—O. R. Vertiz
Assistant Examiner—Wayne A. Langel

[57] ABSTRACT

A mixture is prepared from quartz sand, dolomite and/or limestone, sodium carbonate and/or cryolite and having a composition of from about 30 to about 60% $SiO_2$, from 0 to about 5% $Al_2O_3$, from 0 to about 2% $FeO+Fe_2O_3$, from about 5 to about 30% $MgO$, from about 20 to about 40% $CaO$, and from about 2 to about 10% $Na_2O$ and/or $K_2O$. Within the above limits the ratio of the components can vary within the following ranges: $SiO_2/CaO = 1.6-2.25$, $SiO_2/MgO = 2.8-5.7$, $CaO/MgO = 1.5-3.4$, $SiO_2+MgO = 2.8-5.7$, $SiO_2/CaO+MgO = 1-1.42$.

The foregoing mixture is melted between 1,250° and 1,400° C., then it is allowed to stand, depending on the mass and the casting form used, for a period of 1–4 hours. The melt is cooled in the casting forms between 1,250° and 1,050° C. for a period of 0.5 to 1.5 hours, with or without maintenance of a substantially constant temperature within that temperature range for 15–90 minutes while spontaneous crystallization takes place without reheating and without the presence of a nucleating agent. After crystallization the shaped mass is cooled at a rate of between 10° and 200° C./hour.

The resulting product can be white, or if a coloring metal and/or metal compound is added, then colored throughout the body of the material, having a single crystalline phase with the individual crystalline aggregates being in the order of magnitude of about a millimeter to about a centimeter. The resulting product is resistant against acids and bases and has an easily polishable natural crystalline surface.

11 Claims, No Drawings

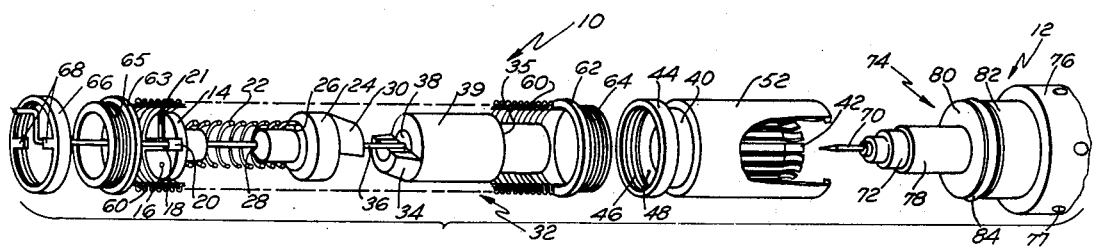

ARTIFICIAL STONE AND METHOD FOR MAKING

This application is a continuation-in-part of application Ser. No. 369,142 filed June 12, 1973, and now abandoned.

The present invention relates to white or internally colored artificial stone, more particularly to such artificial stone which is colorfast, has good resistance against acids and bases and is a polishable crystalline artificial stone suitable for decorative and other architectural covering uses.

Contemporary architecture increasingly requires a greater variety of architectural covering materials to accomplish certain aesthetic effects which tend to provide large, monolithic and monotonous surfaces with color. There are a number of processes which were developed to make available colored stone panels. According to one of these processes panels were coated with colored crushed stone or colored glass cullet or the individual panels were coated with a colored enamel. These processes have many drawbacks. For example, the crushed stone- or cullet-covered panes were not durable, because these crushed particles were only tenuously attached to the panel surface, the scale of available colors was limited, and the preparation of a chemical enamel was a sensitive process which was difficult to control and was also costly.

There are other methods known which accomplish surface coloring in the case of multicomponent silicate systems more economically than is accomplished in the case of routine ceramic techniques. Such multicomponent silicate systems are, for example, synthetic fused cast rocks made from coal slag raw material. Even in the case of these prior art processes the color was only in the surface layers while the bulk of the panel was black or very dark. Obviously, even in the case of these surface-colored panels the colored layers were easily damaged.

U.S. Pat. No. 3,928,047 assigned to a common assignee herewith relates a multiple-phase crystalline material that is entirely different from the material of the present application. Furthermore, the multiple-phase artificial stone of that patent differs not only structurally from the single phase product of the present invention, but also the chemical, physical and aesthetic properties of these different materials differ from each other.

The two materials are crystallized at somewhat different temperatures and the time it takes to carry out the spontaneous crystallization of the present invention is generally considerably shorter.

Another characteristic of the material and process of said patent is that the chemical composition of the melt changes continuously as the crystallization progresses. This accounts for the multi-phase material with varying considerably from the present invention in which the composition of the melt remains constant during crystallization, resulting in a single phase product.

The viscosity of the melt of the material of U.S. Pat. No. 3,928,047 is "longer" than that of the melt of the material of the present invention. This means that the viscosity of the melt of the present material varies more abruptly as a function of the temperature. The material with the longer viscosity requires a considerably longer time for fining of the melt, i.e. the removal of the occluded gases. The "shorter" viscosity melt of the material of the present invention can be poured into larger forms, because the viscosity is very low at the melting temperature, will fill out the forms more evenly and is, therefore also capable to be used to form slabs of lesser thickness.

It is a principal object of the present invention to provide an economical method whereby white or throughout colored crystalline, acid- and base-resistant, easily polishable artificial stone can be prepared which has sufficient strength characteristics and can be used as a structural or paneling material.

In accordance with the present invention a starting material is prepared by mixing quartz sand, dolomite and/or limestone, and sodium carbonate and/or cryolite to obtain a starting composition of from about 30 to about 60% $SiO_2$, from 0 to about 5% $Al_2O_3$, from 0 to about 2% $FeO+Fe_2O_3$, from about 5 to about 30% $MgO$, from about 20 to about 40% $CaO$, and from about 2 to about 10% $Na_2O$ and/or $K_2O$. The composition is outside the vitrification range of the system constituted of these ingredients and, therefore, it will spontaneously crystallize from a melt without the use of any use of nucleating seeds. The invention is based on the discovery that if the above composition is melted at a temperature between about 1,250° and about 1,400° C., cast into a form and is allowed spontaneously to crystallize by cooling the shaped mass between 1,250° and 1,050° C. for a period of 0.5 to 1.5 hours, with steady cooling, or by maintaining the shaped mass at a substantially constant temperature at one or more points during the crystallization phase, and then cooling the crystallized mass at a rate of from about 10° to about 200° C./hour, then the novel, highly useful product of the present invention is obtained, without substantially any glassy phase.

Suitably the stoichiometric composition of the crystal phase, as expressed through the oxides, comprises the ratios of $SiO_2/CaO=$ from about 1.6 to about 2.25, $SiO_2/MgO=$ from about 2.8 to about 5.7, $SiO_2/CaO+MgO=$ from about 1 to about 1.42, and $CaO/MgO=$ from about 1.5 to about 3.4. Since the composition of the melt and the shaped mass remains essentially constant during crystallization, no phase separation occurs and the resulting product is essentially of a single phase or of a quasi-single phase (magmatic).

Spontaneous crystallization of the melt can be regulated by the adjustment of the ratios of ingredients. Thus as the $SiO_2/MgO+CaO$ ratio decreases, crystallization will commence at the higher parts of the temperature range, i.e. the liquidus temperature of the crystalline phase is increased. Also, in the case of a given $SiO_2/MgO+CaO$ ratio, a higher rate of growth of the crystalline phase can be obtained as the $MgO+CaO/Na_2O+K_2O$ ratio is increased. The melting point as well as the crystallization can be conveniently influenced by varying the amount of cryolite. When the starting composition is adjusted to contain from about 2 to about 2.2 $SiO_2/CaO$, from about 2.9 to about 3.1 $SiO_2/MgO$, from about 1.2 to about 1.3 $SiO_2/RO+R_2O$, and from about 1.35 to about 1.45 $CaO/MgO$ as the principal ingredient ratios, and crystallization is carried out mainly in the temperature range of from about 1,150° to about 1,220° C., then the crystalline phase will contain almost entirely monoclinic pyroxene crystals. When the $SiO_2/CaO$ or the $SiO_2/RO+R_2O$ ratio decreases in the starting material various unsaturated silicates, such as monticellite ($CaMgAlSiO_4$), akermanite ($Ca_2(MgSiO_7)$), etc. are formed the amount and composition of which primarily depends in a given case on the $CaO/MgO$ ratio in the starting composition. When dolomite and quartz sand are used as the amount of $SiO_2$ decreases, then —depending on the degree of saturation —mainly monticellite will be formed as the unsaturated component. When dolomite, limestone and sand are used as the starting ingredients in a ratio of from about 1 to about 1.25 $SiO_2/RO+R_2O$ then, in addition to monoclinic pyroxene, akermanite and merwinite $(Ca_3Mg(SiO_4)_2)$ can form as the unsaturated component, and when an excess of limestone is used then rankinite $(Ca_3Si_2O_7)$ and wollastonite $(CaSiO_3)$ can form as the unsaturated component. However, as the $CaCO_3$ content of the starting material is increased the melting point also increases and the latter increase cannot or can hardly be compensated by the increase of the $Na_2CO_3$ content of the starting ingredients. The ratios of $SiO_2/MgO+CaO+Na_2O$ and of $SiO_2/MgO+CaO$, respectively, strongly affect the melting point, because as these ratios are decreased the melting point increases in an almost linear fashion. In the case of $SiO_2/MgO+CaO=0.75$ or $SiO_2/MgO+CaO+Na_2O=0.65$ or thereabouts the melting point of the material is at about 1,400° C. which increases the practical difficulties in the industrial realization of the process. The concentration of the alkali metal oxide ingredient strongly affects the spontaneous crystallization. With the decreasing concentration of e.g. sodium the crystallization temperature decreases as well and the growth rate of the crystals and their size are increased.

The form of the ingredients depends somewhat on the additives to be employed. When a lesser amount of additives are used mainly laminar crystals are formed and the addition of more sodium carbonate brings about primarily laminar-elongated crystals. When cryolite is used a resistant product of mainly fibrous crystalline structure is formed.

The starting materials are combined according to the desired crystal composition and the crystal form of the resulting solid state influences the texture and aesthetic appearance of the end product. A product composed of monoclinic pyroxene has a fibrous crystalline character whereas the unsaturated silicates in the mellitic system give a column-like crystalline character.

The product of the present invention can be employed in large scale objects due to its preferable physical properties. 8–10 mm thick paneling can be made, and flooring with a slab thickness of 20–25 mm. The abrasion resistance and colorfastness of the throughout colored product are very good. Color retention is good, because the product is colored throughout its entire cross section and the color is uniform, because the coloring cation is built into the crystal lattice. Due to the variability of surface appearance and finish and the flexibility of coloring, the product of the present invention can be employed for the widest forms of decorative architectural expressions.

The molten material in accordance with the present invention has "short" viscosity characteristics. Depending on the ratios of the ingredients the melt can become fluid in as short a range as 5°–20° C. Consequently any gases in the melt made from the starting mixture—mainly $CO_2$—will leave the melt rather rapidly. The size of the crystals can vary from a few nm to a diameter of 4–5 cm. The desired nature of the crystals of the product will determine the temperature, duration and cooling rate during and after crystallization, on the basis of the principles enumerated in this disclosure, on the basis of crystallization experience brought to bear by an expert in the art and on the basis of routine experimentation.

Thus the beginning of spontaneous crystallization shifts towards higher temperatures in proportion to the decrease of the $SiO_2/MgO+CaO$ ratio. At a given crystallization temperature an increase of the $MgO+CaO/Na_2O$ ratio markedly increases the rate of growth of the crystals. In this manner the crystalline composition of the end product and the degree of crystallization thereof (the size of crystal particles) can all be determined in advance from the chemical composition of the starting material and from the method of treatment. In the formation of the desired crystalline phase one must also take into consideration that in the presence of cryolite tough, fibrous, high-strength crystals are formed, while from a cryolite-free melt the resulting crystals are more plank-like, tabular or nearly isometric. Thus it can be seen that cryolite markedly affects the shape of the resulting crystalline phase. Potassium generally strongly reduces the tendency of the melt to crystallize, and as the sodium content is reduced the melting point and the crystallization temperature will somewhat increase and the tendency to crystallize will sharply increase. On the other hand, as the $SiO_2$ content is decreased the melting point and crystallization temperature will increase and the crystallization tendency decreases. When the melt contains chromium trioxide, one cannot produce a coarse-crystalline product with the usual techniques, thus chromium trioxide reduces the growth rate of crystals, and the presence of cobalt also reduces the crystallization tendency of the melt. In contrast, the addition of copper and to some extent also of manganese will increase the tendency of the melt to crystallize. Thus it can be seen that the coloring cations which have varying valencies, can markedly affect spontaneous crystallization, the formation of crystal nuclei, and the growth rate of the crystals, respectively. This effect also varies as a function of temperature.

The coloring cations build into the crystal lattice and, as observed by microscope, the incorporation is frequently of a periodic character. Sometimes such a periodicity results in such strong alternation of coloring that different color zones can even by observed by the naked eye.

Copper, depending on its oxidation condition, colors the mass to blue or reddish brown color and in proportion to the amount of the colorant, to a lighter or darker shade. Manganese colors the product from pale lilac to dark lilac shades. Chromium colors the mass, depending on its state of oxidation, to green or yellow color. With a cobalt additive a blue end product can be obtained. Depending on its oxidation stage, iron in very small amounts colors to green or yellow. The amount of iron in the mass plays a decisive role. Above a predetermined concentration the presence of iron retards coloring because larger amounts of iron imparts a dark brown or black tone to the mass. The maximum amount of tolerable iron can be determined for each composition by routine experimentation. Titania addition allows the mass to retain its white color or can even act as a brightener by increasing light reflection.

When the starting material contains less than 0.1% iron than the resulting product is still white or at least lightly colored. With increasing iron content the product becomes increasingly darker green, depending also on the degree of oxidation. In the case of even higher concentrations of iron gradually darker, greenishbrown, brown or brownish red colored products can be obtained.

Copper sulfate contributes a greenish-blue color under oxidizing conditions, while under reducing conditions the resulting color will be red (sang de bouef). Addition of metallic copper to a few tenths of a percent of iron-containing starting material will reduce the ferric and ferrous ingredients which, together with the resulting cuprous component will result in a characteristic green and brown blotchy coloring of the product. Manganese carbonate produces pink and manganese dioxide violet coloring. When manganese dioxide is mixed with a few tenths of a percent of ferric and ferrous oxides then a meat-red or violet-brown colored product is obtainable. Chromic oxide produces green and divalent chromium compounds produce intensive blue coloring when employed in a concentration of about 0.1%.

The process of the present invention is further illustrated with the following examples. All percentages throughout the specification and claims are by weight. The origins of the raw materials used are given in the following listing which is followed by a table giving the chemical compositions of the ingredients numbered in the listing. The data in the table are in percentages.

1. Fine-grained quartz sand from the rock quarry at Fehérvárcsurgó, Hungary.
2. Fine-grained pannonia quartz sand from the rock quarry at Bicske, Hungary.
3. Fine-grained pannonia sand from the road construction mines at Gödöllö, Hungary.
4. Fine-grained aleurite sand, jura-age, from the XII/a shaft in Tatabánya, Hungary.
5. Triassic dolomite from Tatabánya, Hungary.
6. Triassic dolomite from Tatabánya, Hungary.
7. Triassic limestone.

|  | wt % | | | | | | |
|---|---|---|---|---|---|---|---|
|  | 1 | 2 | 3 | 4 | 5 | 6 | 7 |
| $SiO_2$ | 94.2 | 90.2 | 69.5 | 63.0 | — | — | 3.2 |
| $TiO_2$ | 0.03 | 0.14 | 0.32 | 0.35 | 0.5 | 0.25 | 0.06 |
| $Al_2O_3$ | 0.28 | 1.81 | 6.6 | 3.22 | — | — | 1 |
| $Fe_2O_3$ | 0.04 | 0.62 | 2.23 | 1.08 | — | — | — |
| FeO | 0.02 | 0.18 | 0.43 | 0.65 | 0.07 | 0.04 | 0.36 |
| MnO | — | 0.02 | 0.09 | 0.08 | — | — | — |
| MgO | 0.2 | 1.07 | 2.4 | 3.23 | 21.9 | 21.15 | 2.9 |
| CaO | 2.52 | 2.1 | 6.8 | 13.4 | 34.2 | 31.8 | 49.9 |
| $Na_2O$ | 0.02 | 0.38 | 1.38 | 0.94 | — | — | — |
| $K_2O$ | 0.17 | — | 1.74 | — | — | — | — |
| $H_2O^-$ | 0.11 | 0.96 | 0.27 | — | 0.1 | 0.11 | — |
| $H_2O^+$ | — | 1.42 | — | 1.18 | — | — | — |
| $CO_2$ | 2.07 | 0.32 | 8.4 | 12.4 | 45.0 | 46.05 | 42.0 |
| $P_2O_5$ | — | 0.57 | 0.05 | 0.18 | — | — | — |

Material 1 contained 4–5% calcite and traces of montmorillonite in addition to quartz; material 2 also contained montmorillonite and goetite; material 3 contained varying amounts of biotite and mica in addition to calcite and clays; and material 4 contained 16% calcite with small amounts of magnesium and montmorillonite.

EXAMPLE 1

39.5% material 1, 52.5% material 5, 7% sodium carbonate and 1% crystalline copper sulfate were mixed and then melted at 1,240° C. At the beginning of the melting process the solid phase floats like ice on top of the fluid melt. The melt was held at 1350°–1300° C. at which temperature it became fined rather quickly. The fluid melt was cooled to 1,200°–1,150° C. and held there for about 30 minutes. A crystalline mixture of monoclinic pyroxene of a particle size of 0.5–1 cm and somewhat lesser amount of gehlenite was obtained. The copper content was partly reduced from cupric to cuprous. The cupric ingredient colored individual crystalline component bluish-green and the cuprous ingredient contributed a brown color. Due to the larger proportion of the cupric component the end product had an overall color of bluish-green.

EXAMPLE 2

40% of material 1, 52.7% of material 5, 7% sodium carbonate and 0.3% crystalline copper sulfate were mixed and then melted and crystallized at the temperatures employed in Example 1. The firing circumstance were, however somewhat of a more reducing character than in the preceding example. The resulting product was a characteristically reddish-purplish crystalline material.

EXAMPLE 3

The composition of Example 2 was melted and then held at 1,200° C.–1,180° C. for about 15 minutes. The material completely crystallized and the size of the components was mainly 1–2 mm.

EXAMPLE 4

40% of material 1, 52.8% of material 5, 7% sodium carbonate and 0.2% crystalline copper sulfate were mixed and melted. After fining the melt at 1,300° C., it was slowly cooled to 1,200°–1,180° C. During this cooling rather large crystalline particles of 0.5–1 cm size were obtained. The color of the product was greenish-blue and had 1–2 cm thick plates which were characteristically translucent.

EXAMPLE 5

The starting composition of Example 4 was melted and cooled between 1,200° C. and 1,150° C. for a period of 1 hour. The crystalline product contained large, 2–4 cm sized crystal particles.

EXAMPLE 6

A mixture of 42% material 1, 55.9% material 5, 2% cryolite and 0.1% chromium trioxide was melted and well fined between 1,380° C. and 1,330° C. This melt was subsequently quickly cooled at a rate of 80° C./hour to obtain a material containing tough, fibrous, high-strength crystals.

EXAMPLE 7

A mixture of 40% material 1, 52.8% material 5, 7% sodium carbonate and 0.2% chromium trioxide was melted and crystallized by cooling at the rate of 80° C./hour. Yellowish-grass-green fine crystalline product was obtained.

EXAMPLE 8

The composition of Example 7 was melted butter and then crystallized by maintaining at 1,200°–1,150° C. for a period of 90 minutes. The resulting product was finely crystallized as the product of Example 7. Due to the crystal growth-rate reducing effect of the chromium trioxide only finely crystallized product could be obtained.

EXAMPLE 9

A mixture of 40% material 1, 52.7% material 5, 7% sodium carbonate and 0.3% manganese dioxide was melted and then crystallized by holding for 15 minutes at about 1,200° C. A purplish colored product containing crystal particles of 0.3–0.5 cm size was obtained.

EXAMPLE 10

The molten material of Example 9 was held at 1,200° C. for 90 minutes. During the course of the crystallization partly radially oriented, 1–2 cm long crystals were formed. The resulting product was of violet color.

EXAMPLE 11

A mixture of 40% of material 1, 57% of material 6 and 3% sodium carbonate was melted and then crystallized at 1,250°–1,200° C. for 20 minutes. A white product containing 4–5 cm crystals was obtained.

EXAMPLE 12

A mixture of 40% of material 1, 53% of material 6 and 7% sodium carbonate was melted and then crystallized for 20 minutes at 1,230°–1,180° C. A white product containing 0.5–1 cm size crystals, was obtained.

EXAMPLE 13

A mixture of 30.2% material 1, 62.9% material 6 and 6.9% sodium carbonate was melted at 1,350° C., and then crystallized by holding for 30 minutes at 1,280°–1,230° C. A white product containing fine-grained crystals, was obtained.

EXAMPLE 14

A mixture of 40% material 1, 28.2% material 6, 24.3% material 7 and 7.5% sodium carbonate was melted and then crystallized for 30 minutes at 1,280°–1,250° C. A white, dense crystalline product with fine-grained, high strength, 1–3 mm size particles, was obtained.

EXAMPLE 15

A mixture of 40% of material 2, 53% of material 6 and 7% sodium carbonate was melted and then crystallized for 30 minutes at 1,250°–1,230° C. A light yellow product of varied degrees of crystallization and containing 0.1–3 cm size crystals, was obtained.

EXAMPLE 16

A mixture of 40% of material 2, 52.8% of material 6, 7% sodium carbonate and 0.2% crystalline cupric sulfate was melted and then crystallized as in Example 15. A characteristically varied colored crystalline product was obtained which had a blotchy green and brown coloration due to partly oxidation of the copper and partly to the partial or total reduction of the ferric salt content of the material.

EXAMPLE 17

A mixture of 40% of material 2, 52.8% of material 6, and 7% sodium carbonate, and 0.2% cobalt oxide was melted and crystallized as in Example 15. The effect of the iron which was present did not manifest itself, because the blue color contributed by the cobalt oxide predominated and a finer grained material was obtained than in the case of Example 15. Thus the cobalt oxide also reduced the rate of growth of the crystals.

EXAMPLE 18

A mixture of 40% of material 4, 53% of material 6 and 7% sodium carbonate was melted and then crystallized. The resulting artificial magmatite contained mainly cubic honey-yellow gehlenite which reduced the acid resistance of the product.

EXAMPLE 19

A mixture of 40% of material 3, 53% of material 6 and 7% sodium carbonate was melted and crystallized. The resulting product was a reddish-brown to dark brown colored artificial magmatite in which only the coloring effect of the iron cation manifested itself. The Al, Na and K content also enabled the crystallization of plagioclase. The resulting product was fine grained and contained mainly 0.1–2 mm size crystalline particles.

EXAMPLE 20

A mixture of 40% of material 3, 51% of material 6, 7% sodium carbonate, and 2% graphite powder was melted and crystallized. The resulting fused-cast stone was a green crystalline product, because the graphite reduced the ferric content of the material to the ferrous form. The crystal particle size of this product was also under 2 mm.

In accordance with the process of the present invention it is possible to produce acid resistant, varied colored and aesthetically more pleasing, well polishable and more thoroughly crystallized product than is possible in the case of natural magmatic stones obtained from the depths of the earth. The products of the present invention are, therefore, useful for the preparation of paneling suitable for interior as well as exterior use.

Summary of compositions and properties of products made according to examples.

| Example: | 1 | 2 | 3 | 4 | 5 | 6 | 7 | 8 | 9 | 10 |
|---|---|---|---|---|---|---|---|---|---|---|
| Ingredient % | | | | | | | | | | |
| $SiO_2$ | 50.3 | 52.8 | 52.8 | 52.8 | 52.8 | 53.8 | 52.8 | 52.8 | 52.8 | 52.8 |
| $Al_2O_3$ | 1.6 | 0.3 | 0.3 | 0.3 | 0.3 | 0.9 | 0.3 | 0.3 | 0.3 | 0.3 |
| $Fe_2O_3$ | 0.2 | 0.06 | 0.06 | 0.06 | 0.06 | 0.06 | 0.06 | 0.06 | 0.3 | 0.3 |
| MgO | 165. | 15.9 | 15.9 | 15.9 | 15.9 | 16.8 | 15.9 | 15.9 | 15.8 | 15.8 |
| CaO | 24.2 | 25.5 | 25.5 | 25.5 | 25.5 | 26.4 | 25.5 | 25.5 | 25.4 | 25.4 |
| $Na_2O$ | 5.6 | 5.1 | 5.1 | 5.1 | 5.1 | 1.8 | 5.1 | 5.1 | 5.1 | 5.1 |
| $K_2O$ | 1.0 | 0.1 | 0.1 | 0.1 | 0.1 | 0.1 | 0.1 | 0.1 | 0.2 | 0.2 |
| Coloring agent | 0.3 | 0.3 | 0.3 | 0.2 | 0.3 | 0.1 | 0.1 | 0.1 | 0.3 | 0.3 |
| Property | | | | | | | | | | |
| Acid resistance (diss.) | no | no | no | no | no | no | no | no | no | no |
| Compressive strg. $kp/cm^2$ | 2050 | 2000 | 2400 | 2100 | 1850 | 2200 | 2200 | 2200 | 2350 | 1800 |
| Abrasion resistance mm | .5 | 5 | 5 | 5 | 5 | 6 | 5 | 5 | 5 | 5 |
| Flex. strgth. $kp/cm^2$ | 180 | 185 | 220 | 180 | 150 | 210 | 210 | 220 | 220 | 140 |
| Hardness | 5.6 | 5.6 | 5.6 | 5.6 | 5.6 | 4.5 | 5.6 | 5.6 | 5.4 | 5 |

-continued

Summary of compositions and properties of products made according to examples.

| | | | | | | | | | | |
|---|---|---|---|---|---|---|---|---|---|---|
| Bulk density g/cm$^3$ | 2.56 | 2.65 | 2.8 | 2.65 | 2.6 | 2.86 | 2.75 | 2.72 | 2.72 | 2.62 |
| Colorfastness | 8 | 8 | 8 | 8 | 8 | 8 | 8 | 8 | 8 | 8 |
| Polishability | well | well | well | well | well | well | well | well | well | well |

| Example: | 11 | 12 | 13 | 14 | 15 | 16 | 17 | 18 | 19 | 20 |
|---|---|---|---|---|---|---|---|---|---|---|
| Ingredient % | | | | | | | | | | |
| SiO$_2$ | 53.1 | 55.6 | 46.5 | 53.2 | 49.5 | 52.8 | 52.8 | 51.2 | 51.2 | 52.2 |
| Al$_2$O$_3$ | 0.26 | 1.9 | 1.8 | 0.5 | 1.8 | 0.3 | 0.3 | 1.2 | 1.2 | 1.2 |
| Fe$_2$O$_3$ | 0.06 | 1.2 | 1.1 | 0.2 | 1.1 | 0.06 | 0.06 | 0.5 | 0.5 | 0.5 |
| MgO | 17.1 | 12.5 | 16.2 | 9.3 | 16.2 | 15.9 | 15.9 | 16.7 | 16.7 | 16.6 |
| CaO | 26.9 | 23.3 | 28.6 | 31.0 | 25.6 | 25.5 | 25.5 | 24.1 | 24.1 | 23.2 |
| Na$_2$O | 2.4 | 5.0 | 5.0 | 6.1 | 5.0 | 5.1 | 5.1 | 5.0 | 5.0 | 5.0 |
| K$_2$O | 0.1 | 0.5 | 0.9 | 0.1 | 0.9 | 0.1 | 0.1 | 0.8 | 0.8 | 0.8 |
| Coloring agent | — | — | — | — | — | 0.03 | 0.05 | — | — | — |
| Property | | | | | | | | | | |
| Acid resistance (diss.) | no | no | slight | no | no | slight | slight | slight | slight | slight |
| Compr. strgth. kp/cm$^2$ | 1500 | 1900 | 2000 | 2500 | 2300 | 2300 | 2350 | 2200 | 2500 | 2500 |
| Abrasion resistance mm | 5 | 5 | 5 | 5 | 5 | 5 | 5 | 5 | 5 | 5 |
| Flex. strgth kp/cm$^2$ | 130 | 160 | 180 | 220 | 210 | 210 | 220 | 200 | 220 | 220 |
| Hardness | 5.2 | 5 | 5 | 5.5 | 5.5 | 5.5 | 5.5 | 5.5 | 5.6 | 5.6 |
| Bulk density g/cm$^3$ | 2.60 | 2.70 | 2.70 | 2.9 | 2.85 | 2.7 | 2.78 | 2.75 | 2.8 | 2.8 |
| Colorfastness | 8 | 8 | 8 | 8 | 8 | 8 | 8 | 8 | 8 | 8 |
| Polishability | well | well | well | well | well | well | well | well | well | well |

Strength values depend from the grain size of material and its texture

We claim:

1. A method for the production of white or throughout colored acid-and base-resistant high-strength artificial stone, comprising preparing a starting material containing from about 30 to about 60% SiO$_2$, from 0 to about 5% Al$_2$O$_3$, from 0 to about 2% FeO+Fe$_2$O$_3$, from about 5 to about 30% MgO, from about 20 to about 40% CaO, and from about 2 to about 10% Na$_2$O and/or K$_2$O, which composition is outside the vitrification range of the system defined by these components, by mixing sand, dolomite and/or limestone, and sodium carbonate and/or cryolite, melting the starting material which contains no nucleating agents at a temperature between about 1,250° and about 1,400° C., casting the melt into a form, and subjecting the melt to spontaneous crystallization without reheating, between about 1,250° and about 1,000° C. for a period from about 0.5 to about 1.5 hours to form a crystallized mass essentially without a glassy phase, and thereafter cooling the crystallized mass.

2. The method of claim 1, wherein the ingredients of the starting material are present in the following composition ratios as expressed in the form of their oxides: SiO$_2$/CaO=from about 1.6 to about 2.25; SiO$_2$/MgO=from about 2.8 to about 5.7; SiO$_2$/CaO+MgO=from about 1 to about 1.42, and CaO/MgO=from about 1.5 to about 3.4.

3. The method of claim 1, wherein said starting material further contains from about 0.01 to about 5% of a coloring metal and/or a coloring metal compound.

4. The method of claim 1, further comprising after melting resting the melt for a period from about 1 to about 4 hours.

5. The method of claim 1, wherein the temperature at which spontaneous crystallization starts to occur is increased by proportionally reducing the SiO$_2$/MgO+CaO ratio in the composition of the starting material.

6. The method of claim 1, wherein in the case of a given SiO$_2$/MgO+CaO ratio in the starting material the rate of crystal growth is increased by proportionally increasing the MgO+CaO/Na$_2$O+K$_2$O ratio in the composition of the starting material.

7. The method of claim 3, wherein one or more of the following coloring metals and/or coloring metal compounds is employed in the composition of the starting material; from about 0.01 to about 0.05% metallic copper, from about 0.1 to about 1% crystalline cupric sulfate, from about 0.2 to about 2% manganese carbonate, from about 0.1 to about 0.3% manganese dioxide, from about 0.05 to about 0.3% chromium trioxide, from about 0.05 to about 0.2% cobalt oxide, from about 0.1 to about 0.2% ferrous and/or ferric compounds, from about 0.1 to about 0.5% titanium dioxide, and from about 0.1 to about 0.5% vanadium pentoxide.

8. The method of claim 1, wherein the spontaneous crystallization is carried out by holding the cast product at a substantially constant temperature within said temperature range for said time period, or by cooling the cast product within said temperature range at a cooling rate from about 30° to about 80° C./hour, or within said time period by holding the cast product at a substantially constant temperature within said temperature range and also by cooling it at said cooling rate within said temperature range.

9. The product of the process of claim 1.

10. A white or throughout colored acid- and base-resistant artificial stone having substantially no vitreous component, consisting essentially of from about 46 to about 53.5% SiO$_2$, from about 0.3 to about 1.9% Al$_2$O$_3$, from about 0.06 to about 1.1% Fe$_2$O$_3$, from about 9.3 to about 16.8% MgO, from about 23.3 to about 31% CaO, from about 1.8 to about 6.1% Na$_2$O, and from about 0.1 to about 1% K$_2$O, having a compressive strength from about 1,800 to about 2,500 kp/cm$^2$, hardness from about 5 to about 5.6, bulk density from about 2.65 to about 2.85 g/cm$^3$, and a maximum colorfastness of about 8.

11. The artificial stone of claim 10, further comprising from about 0.03 to about 0.3% of a coloring metal and/or coloring metal oxide.

* * * * *